July 15, 1969  F. L. HILL  3,455,453
TOMATO HARVESTER SEPARATOR
Filed Aug. 23, 1967  2 Sheets-Sheet 1
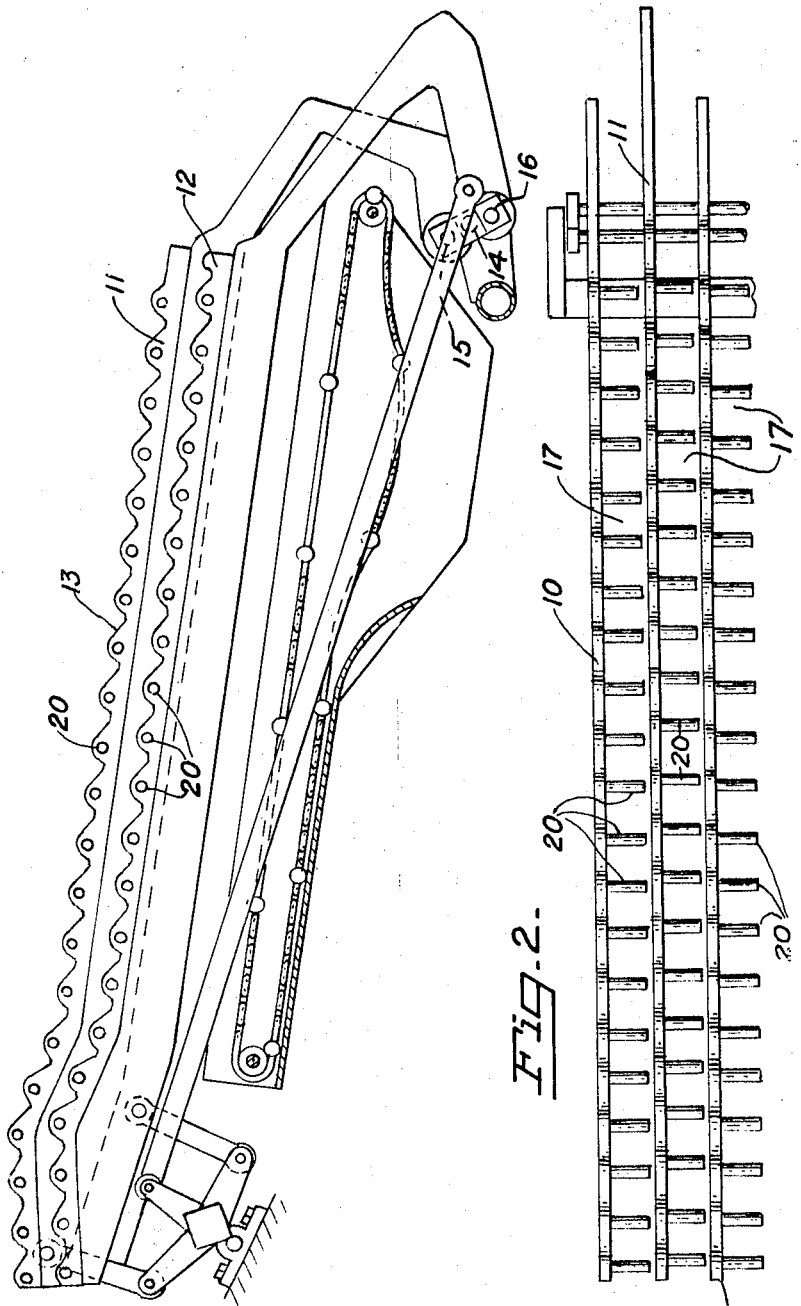
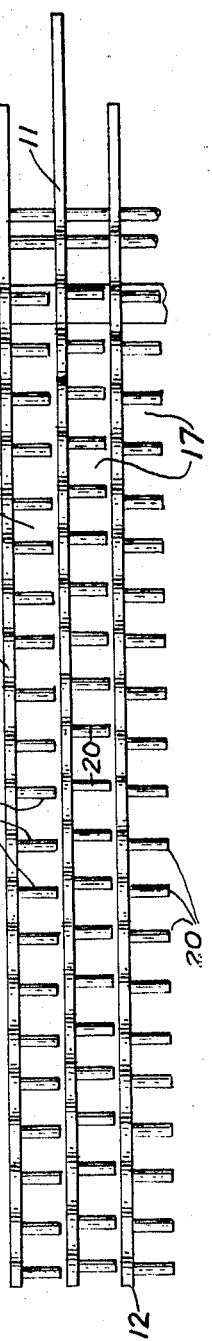
INVENTOR
FREDRICK L. HILL
BY *Owen, Wickersham & Erickson*
ATTORNEYS July 15, 1969  F. L. HILL  3,455,453
TOMATO HARVESTER SEPARATOR
Filed Aug. 23, 1967  2 Sheets-Sheet 2
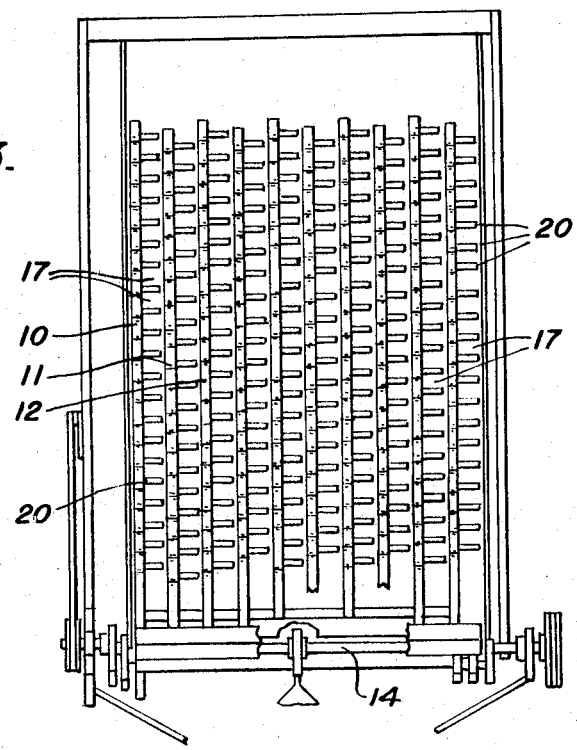
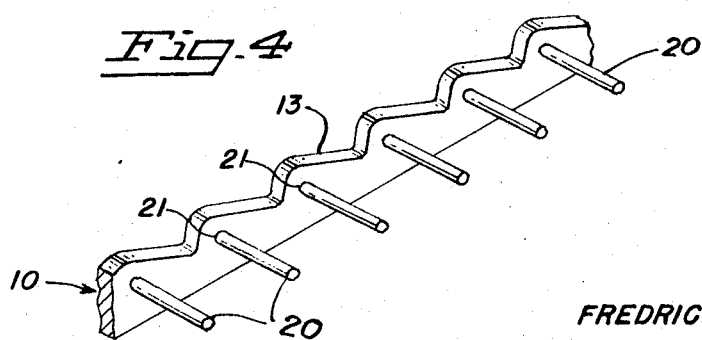
INVENTOR
FREDRICK L. HILL
BY Owen, Wickersham & Erickson
ATTORNEYS

United States Patent Office 3,455,453
Patented July 15, 1969

---

3,455,453
TOMATO HARVESTER SEPARATOR
Fredrick L. Hill, Rio Vista, Calif., assignor to The Regents of the University of California, Berkeley, Calif.
Filed Aug. 23, 1967, Ser. No. 662,760
Int. Cl. A01d *45/00*
U.S. Cl. 209—396
1 Claim

ABSTRACT OF THE DISCLOSURE

This tomato harvester separator, of the type having lengthwise extending members with lengthwise extending gaps in between them, has a series of slender resilient fingers extending transversely from all except one lengthwise extending member into each gap. The fingers are spaced apart approximately twice the width of the gap, and are nearly as long as the gap is wide but slightly short of spanning the gap. The fingers have sufficient resiliency so that when a fruit of the crop being harvested lands on a finger, it gives and flexes and the fruit falls through; the fingers have sufficient rigidity to retain thereon stems, leaves and other lightweight vegetative matter.

---

This invention relates to crop harvesters of the type having separating devices employing shaking action.

An example of harvesters for which this invention is especially effective is a tomato harvester wherein the tomato plants are first severed from their roots, and then are lifted to a separating device where they are taken to separate the tomatoes from the plants. Such a device is shown in U.S. Patent 3,252,464, where the shaking device comprises a number of longitudinally extending bars alternate bars being mounted in different sets that move 180° apart in both up-and-down and fore-and-aft movement, preferably so that any one point on the bar moves through a circle. Other shaking devices are also in use, some of them comprising longitudinally extending chains having projecting members which engage the tomato plants, the chains being shaken by forward-and-stopping movement, or by forward-and-rear movement, there being no substantial up-and-down movement. The tomatoes, in all such types of apparatus, are intended to be shaken from the vines and to fall down through the longitudinal gaps between the longitudinally shaking members. The tomatoes are then collected on some type of collecting conveyor, which thereupon conveys them to sorting conveyors where the tomatoes are sorted to remove the culls.

In all such shaking devices there have been problems because not only the tomatoes but also leaves, stems, whole vines, weeds, and other vegetative matter have fallen through the longitudinal gaps and have caused difficulties, especially in the later sorting operations, and also have tended to cause plugging of air nozzles, where forced-air separation is used between the collecting conveyors and the sorting conveyors. Particularly, when harvesting relatively small plants or in fields where there are lots of weeds, the small plants and weeds have tended to fall through the longitudinal gaps along with the tomatoes. When carried over the air nozzles, these small plants and weeds tended to get into the nozzles plugging them and thereby causing the machine to have to stop until the nozzles could be cleared. They also delayed the sorters, because much of their time had to be spent in removing such vegetative matter that had not been blown away. The effect was particularly troublesome when vines came along the sorting belt with the tomatoes still on, for the sorters then had to remove the tomatoes one way or another, instead of devoting themselves solely to their sorting operation. Such problems have caused delays and have slowed down the entire harvesting operation, thereby increasing the labor costs relative to the price secured for the crop.

The present invention is directed to this problem and solves it by attaching to the fore-and-aft extending members a series of resilient fingers, which extend substantially across the longitudinal gap, and are spaced one from another approximately twice the width of the gap, so that materials such as stems, plants, and weeds are caught thereupon and are carried to the rear of the separator and dumped there instead of falling through onto the separating conveyor, and at the same time permitting tomatoes which have been freed from the vine to fall through the gap. Thereby, the amount of plugging material or other waste which falls onto the collecting conveyor is materially reduced, and a much cleaner crop is obtained. The plugging of air nozzles is materially reduced, and much less sorting time is lost.

Other objects and advantages of the invention will appear from the following description of a preferred form of the invention, based upon a separator like that shown in U.S. Patent 3,252,464, although the invention applies to other separators also.

In the drawings:

FIG. 1 is a view in side elevation and partly in section of a portion of a separator of the type shown in U.S. Patent 3,252,464, showing two sets of longitudinally extending shaking bars embodying the principles of this invention.

FIG. 2 is a top plan view of a portion of the separator of FIG. 1 showing fingers of the invention extending across the gaps.

FIG. 3 is a top plan view on a reduced scale of a separator embodying the principles of the invention.

FIG. 4 is a fragmentary view in perspective of one of the shaking bars and its fingers.

In this invention, a shaker includes a plurality of parallel walking bars 10, 11, 12, etc. mounted vertically, each with an upwardly extending undulating resilient upper surface 13. The bars 10, 11, 12, etc. are made to produce a walking action by a crankshaft 14 at the forward end which has a pair of diametrically opposed crank pins 15 and 16. The connection at the rear is essentially the same as that shown in U.S. Patent 3,252,464. The fruit falls down through longitudinal gaps 17. Other kinds of shakers can be used which will also have fore-and-aft members, including chains instead of bars.

In the invention, a plurality of regularly spaced apart resilient fingers 20 is employed. Each bar 10, 11, 12, etc. preferably has a series of such fingers 20 extending from it nearly to but short of the next bar, across most of the gap 17. Of course, one bar at the edge has no fingers, since there is no gap beyond it. The fingers 20 are preferably about the size of human fingers, and are made from rubber so that they are sufficiently resilient to give and let tomatoes and other such fruit force them down readily and then fall in between them. The flexing downwardly of these fingers 20 is important, because some tomatoes are quite likely to fall directly on the fingers 20 some of the time, and it is desirable that the finger 20 in that instance simply give, flex down and let the tomato through without injuring it. However, when stems, grass, or leaves or other matter which can span the fingers begin to fall into the gap 17, they do not have sufficient weight to cause the fingers 20 to flex; so they are simply carried along and eventually are discarded from the rear end of the shaker in the same manner as the tomato vines and other waste matter have been intended to be discharged all along.

The fingers 20 may be mounted by providing a series of spaced openings 21 through the walking bars 10, 11, 12 etc., in which the fingers 20 are inserted, being retained by their own resiliency or by any suitable type of securing means. Preferably the fingers extend out from only one bar at each gap 17 and from only one side of the gap 17, because it has been found that when two sets of fingers extend out toward each other from two bars an undesirable type of combing action tends to nullify the good results obtained by having them extend out from one bar and moving in the same direction as that bar.

The use of this device has greatly increased the cleanliness of the tomato harvesting operation, and has thereby increased the efficiency of the operation and enabled a greater output per acre. The workers do not have to spend time removing vines from the air nozzles, nor in shaking or otherwise removing tomatoes from plants at the sorting conveyor. Such occurrences are rare indeed when the device of this invention is used.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a tomato harvester and the like a separator device comprising:
   two series of parallel lengthwise extending walking bars with lengthwise extending gaps in between them, the bars of one series alternating with those of the other series,
   means for oscillating said bars so that any point on each bar moves in approximately a circle in a vertical plane, the bars of one series being 180° out of phase with the bars of the other series,
   a series of slender resilient fingers secured to and extending transversely from each said bar except one, into each said gap on one side only of said bar,
   said fingers being spaced apart approximately twice the width of said gap, and being nearly as long as said gap is wide but slightly short of spanning the gap,
   said fingers having sufficient resiliency so that when a fruit of the crop being harvested lands on a said finger it gives and flexes and the fruit falls through, and having sufficient rigidity to retain thereon stems, leaves and other lightweight vegetative matter.

References Cited

UNITED STATES PATENTS

| 528,434 | 10/1894 | Jessup | 209—393 |
| 3,064,812 | 11/1962 | Wenner | 207—396 |
| 3,286,774 | 11/1966 | Lorenzen | 171—27 X |

FOREIGN PATENTS

| 184,213 | 5/1906 | Germany. |
| 629,904 | 9/1949 | Great Britain. |

HARRY B. THORNTON, Primary Examiner

R. HALPER, Assistant Examiner

U.S. Cl. X.R.

56—327; 171—27